US010666593B2

(12) United States Patent
Frost et al.

(10) Patent No.: US 10,666,593 B2
(45) Date of Patent: May 26, 2020

(54) SYSTEMS AND METHODS FOR MESSAGING AND COLLABORATION

(71) Applicant: DOMO, Inc., American Fork, UT (US)

(72) Inventors: Aaron Frost, Lehi, UT (US); Adam Landefeld, Lehi, UT (US)

(73) Assignee: DOMO, INC., American Fork, UT (US)

( * ) Notice: Subject to any disclaimer, the term of this patent is extended or adjusted under 35 U.S.C. 154(b) by 4 days.

(21) Appl. No.: 15/928,082

(22) Filed: Mar. 21, 2018

(65) Prior Publication Data

US 2018/0278563 A1    Sep. 27, 2018

Related U.S. Application Data

(60) Provisional application No. 62/474,598, filed on Mar. 21, 2017.

(51) Int. Cl.
| | | |
|---|---|---|
| *H04L 12/58* | (2006.01) | |
| *G06F 21/62* | (2013.01) | |
| *G06F 3/0484* | (2013.01) | |
| *G06F 3/0482* | (2013.01) | |
| *H04L 29/08* | (2006.01) | |

(52) U.S. Cl.
CPC .......... *H04L 51/16* (2013.01); *G06F 3/0482* (2013.01); *G06F 3/04847* (2013.01); *G06F 21/629* (2013.01); *H04L 51/046* (2013.01); *H04L 51/32* (2013.01); *H04L 67/02* (2013.01)

(58) Field of Classification Search
CPC .......... H04L 51/16; H04L 51/32; H04L 67/02
See application file for complete search history.

(56) References Cited

U.S. PATENT DOCUMENTS

| | | | |
|---|---|---|---|
| 7,328,242 B1* | 2/2008 | McCarthy | G06Q 10/10 709/203 |
| 7,383,307 B2 | 6/2008 | Kirkland et al. | |
| 7,797,336 B2 | 9/2010 | Blair et al. | |
| 8,195,646 B2 | 6/2012 | Evans et al. | |
| 8,271,870 B2 | 9/2012 | Verma et al. | |
| 8,930,478 B2 | 1/2015 | Singh | |
| 9,280,529 B2* | 3/2016 | Lemonik | G06F 17/2288 |
| 10,021,059 B1* | 7/2018 | Rao | H04L 51/10 |
| 10,356,567 B2* | 7/2019 | Shirazi | H04M 15/41 |
| 2003/0163537 A1 | 8/2003 | Rohall et al. | |
| 2003/0212746 A1 | 11/2003 | Fitzpatrick et al. | |
| 2005/0078613 A1* | 4/2005 | Covell | H04L 12/1827 370/260 |
| 2005/0149621 A1 | 7/2005 | Kirkland et al. | |
| 2006/0059235 A1 | 3/2006 | Peterson et al. | |
| 2006/0090137 A1 | 4/2006 | Cheng et al. | |
| 2006/0155785 A1 | 7/2006 | Berry et al. | |
| 2007/0047697 A1 | 3/2007 | Drewry et al. | |
| 2008/0037721 A1 | 2/2008 | Yao et al. | |

(Continued)

*Primary Examiner* — Lashonda T Jacobs
(74) *Attorney, Agent, or Firm* — Colby Nipper PLLC

(57) ABSTRACT

A messaging and collaboration system creates channels pertaining to respective resource objects, and provides users with access to channels in accordance with access controls of the resource objects. The messaging and collaboration system manages sub-conversations as channel threads. A messaging interface provides an organized view of the channels and threads to which are user has access, and ties such channels and/or threads to the resource objects to which they pertain.

20 Claims, 7 Drawing Sheets

(56) References Cited

U.S. PATENT DOCUMENTS

| | | |
|---|---|---|
| 2008/0104032 A1 | 5/2008 | Sarkar |
| 2008/0172462 A1 | 7/2008 | Carrer et al. |
| 2009/0094329 A1* | 4/2009 | Ambati .............. G06Q 10/10 709/204 |
| 2009/0100141 A1 | 4/2009 | Kirkland et al. |
| 2009/0106676 A1 | 4/2009 | Brezina et al. |
| 2009/0172644 A1* | 7/2009 | Nagarajan ............ G06F 8/33 717/128 |
| 2010/0235758 A1 | 9/2010 | Shen |
| 2011/0176418 A1* | 7/2011 | Gershinsky .......... H04L 47/12 370/230.1 |
| 2012/0072507 A1* | 3/2012 | Chen ............... H04L 12/1836 709/206 |
| 2012/0124146 A1* | 5/2012 | Hsiao ................ H04L 51/36 709/206 |
| 2012/0124147 A1 | 5/2012 | Hamlin et al. |
| 2012/0143972 A1 | 6/2012 | Malik et al. |
| 2012/0197984 A1* | 8/2012 | Rao ................. G06Q 10/107 709/203 |
| 2012/0198360 A1 | 8/2012 | Wanderski et al. |
| 2012/0246207 A1 | 9/2012 | Evans et al. |
| 2012/0330856 A1* | 12/2012 | Hyder ................ G06Q 10/00 705/321 |
| 2013/0219365 A1* | 8/2013 | Rago ................. H04L 63/08 717/125 |
| 2013/0263023 A1* | 10/2013 | Goodwin ........... G06F 3/0484 715/760 |
| 2014/0067834 A1* | 3/2014 | Hutten ............... G06Q 30/02 707/754 |
| 2014/0149891 A1 | 5/2014 | Moy |
| 2015/0006655 A1 | 1/2015 | Fradin |
| 2015/0032686 A1* | 1/2015 | Kuchoor ............ G06F 17/241 707/608 |
| 2015/0172245 A1 | 6/2015 | Spivey et al. |
| 2015/0207765 A1* | 7/2015 | Brantingham ...... H04L 51/046 715/758 |
| 2017/0103362 A1* | 4/2017 | Choi ............... G06Q 10/06311 |
| 2017/0295119 A1* | 10/2017 | Rosenberg ......... H04L 51/046 |
| 2018/0123814 A1* | 5/2018 | Sexauer ............ H04L 12/1818 |
| 2018/0287982 A1* | 10/2018 | Draeger ............. H04L 51/16 |
| 2019/0171700 A1* | 6/2019 | Dart ................. G06F 17/24 |

* cited by examiner

SYSTEMS AND METHODS FOR MESSAGING AND COLLABORATION

CROSS REFERENCE TO RELATED APPLICATIONS

The Application Data Sheet (ADS) filed herewith is incorporated by reference. Any applications claimed on the ADS for priority under 35 U.S.C. § 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent with this disclosure. This application claims the benefit of U.S. Provisional Patent Application No. 62/474,598, filed Mar. 21, 2017, which is hereby incorporated by reference to the extent such subject matter is not inconsistent with this disclosure.

TECHNICAL FIELD

This disclosure relates to online collaboration and, in particular, to systems and methods for a nested thread model for online communication.

BACKGROUND

Conventional mechanisms for online communication are typically organized around particular topics or points of interest. Messaging systems often establish channels to manage conversations pertaining to respective topics. More specific sub-conversations of a channel are generally managed as threads. The management of threads in conventional messaging and collaboration systems is inadequate. Threads can be difficult to find and/or access within the overall conversation, which can make longer-term collaboration frustrating and impractical. Messaging systems typically order content, including threads, by "most recently received" (or some other criterion). A thread created within an active channel can quickly become buried by other content. The location(s) of threads in a channel may change rapidly, rendering longer-term collaboration using such threads difficult. Moreover, even if threads are anchored within the channel (as "sticky" threads), the content of such threads is typically interspersed with other channel content, which dilutes the focus of the thread from its intended sub-conversation. Managing threads as separate conversations (e.g., promoting a thread to a conversation or channel) may be cumbersome, and is not feasible for many end-users. Managing threads as separate conversations may require complex, time-consuming setup and management operations, such as creating recipient lists, establishing access controls, and so on. Moreover, the resulting conversations may not be grouped with the original, parent channel, which may further complicate access and collaboration. What is needed, therefore, are systems and methods for managing online collaboration and communication that, inter alia, provide improved mechanisms for creating, managing, and accessing threads of parent conversations and/or channels.

DETAILED DESCRIPTION OF PREFERRED EMBODIMENTS

Figure 1:
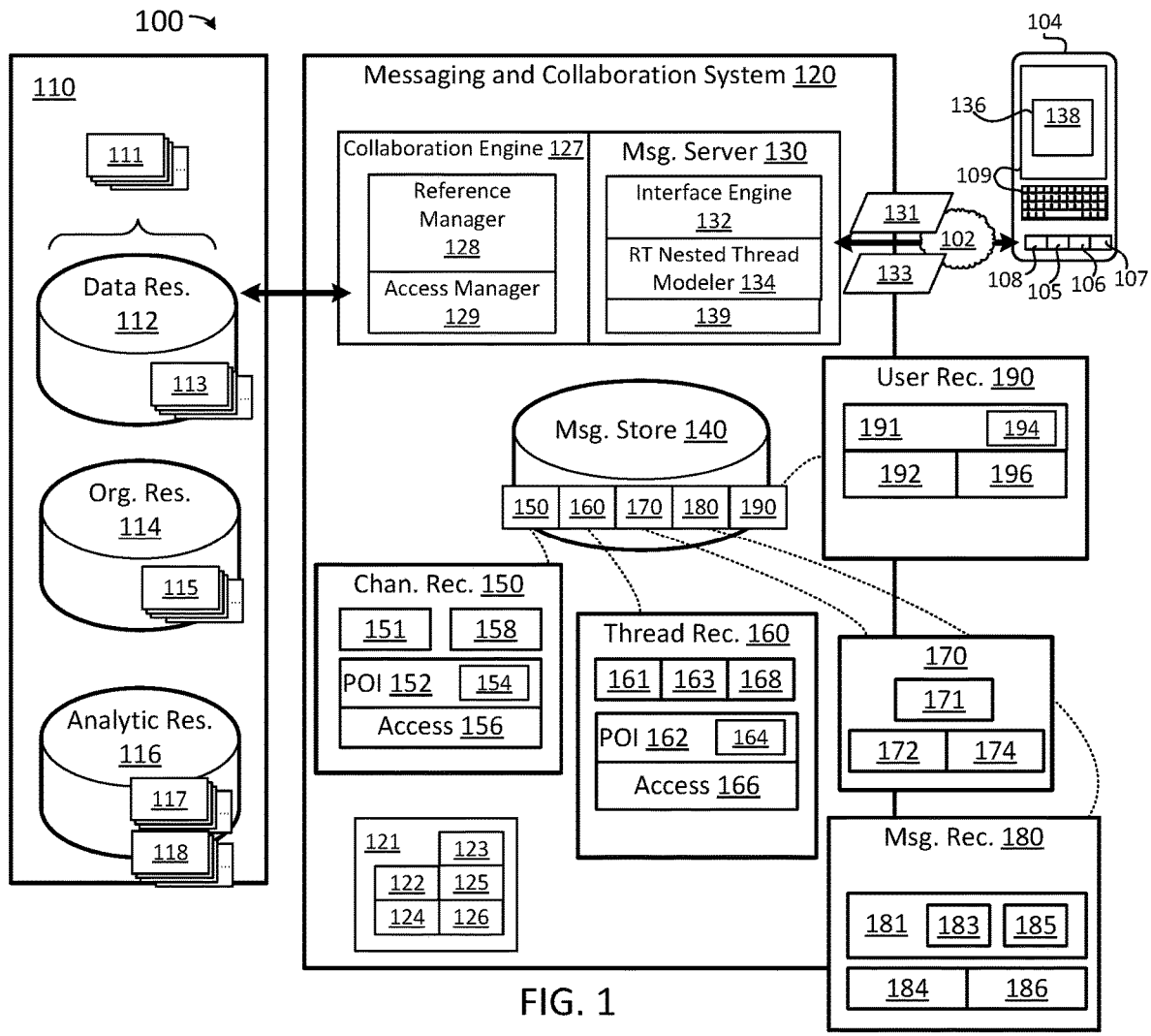
FIG. 1 is a schematic block diagram of one embodiment of a system for online collaboration and/or messaging.

FIG. 1 is a schematic block diagram of one embodiment of a system 100 comprising a messaging and collaboration system (MCS) 120. The MCS 120 may comprise and/or be embodied on one or more computing devices, such as a computing device 121, which may include, but is not limited to: a personal computing device, a server computing device, a rack-mounted computing device, a cluster of computing devices, and/or the like. The computing device 121 may comprise a processor 122, memory 123, non-transitory storage 124, a communication interface 125, human-machine interface components 126, and/or the like. The processor 122 may comprise one or more general-purpose processing units (e.g., central processing units), special-purpose processing units, processing circuits, processing logic units, configurable logic units, graphics processing units, and/or the like. The memory 123 may include, but is not limited to: volatile memory, random access memory (RAM), dynamic RAM, static RAM, battery-backed RAM, cache memory, and/or the like. The non-transitory storage 124 may comprise any suitable means for persistent storage of electronic data including, but not limited to: a magnetic hard drive, a solid-state memory device, a Flash storage device, a non-volatile storage system, a network attached storage, and/or the like. The communication interface 125 may comprise hardware and/or software components configured to communicatively couple the computing device 121 (e.g., MCS 120 and/or components thereof) to an electronic communication network 102. The human-machine interface components 126 may comprise one or more display devices (display screens), input devices (e.g., keyboards, pointer inputs, touch inputs, and/or the like), audio devices, and/or the like.

In some embodiments, portions of the MCS 120 (and/or the components thereof) may be embodied as hardware components, such as processors, circuits, programmable logic circuits, memory devices, non-transitory storage devices, communication interfaces, and/or the like. Alternatively, or in addition, portions of the MCS 120 (and/or the components thereof) may be embodied as computer-readable instructions configured for execution by a computing device and/or processor, such as the processor 122 of the computing device 121. The instructions may be stored on a non-transitory storage medium, such as the non-transitory storage 124 of the computing device 121 and/or the like.

As disclosed in further detail herein, the MCS 120 may be configured to interface with various resources 110 and/or resource objects 111. The resources 110 may include, but are not limited to: data resources 112, organizational resources 114, analytic resources 116, and so on. The resource objects 111 may include, but are not limited to: data objects 113 of one or more data resources 112, organizational objects 115 of one or more organizational resources 114, analytic objects 117 of one or more analytic resources 116, and so on. The resources 110 (the data, organizational, and/or analytic resources 112, 114, and/or 116) may include, but are not limited to: data storage devices, non-volatile storage devices, non-volatile storage systems, file systems, key-value storage systems, structured storage systems, database systems, relational database systems, Structured Query Language (SQL) database systems, eXtensible Markup Language (XML) database systems, directory systems, Lightweight Directory Access Protocol (LDAP) directory systems, X509 directory systems, proprietary directory systems, processing resources, data processing resources, analytics resources, visualization resources, data visualization libraries, graphics libraries, graphics rendering resources, business intelligence systems, data analytics systems, and/or the like.

The data resources 112 may comprise resources configured to manage the storage and retrieval of data objects 113. As used herein, a data object 113 refers to electronically encoded information comprising one or more datum, and may include, but is not limited to: structured data, relational data, comma-separated (CSV) values, a data structure, a table, a list, a database table, a column, a row, a field, an attribute, value, a series, a sequence, Structured Query Language (SQL) structured data (e.g., an SQL result set, a set of rows from a relational database table), an object, a data object, one or more tuples (e.g., one or more attribute-value pairs), key-value data, XML data, unstructured data (e.g., a data blob), and/or the like. A dataset may comprise one or more data elements. A data element may be associated with one or more attributes, such as a name (e.g., column name), type (e.g., data type of the element, such as text, UTF-8, number, INT, FLOAT, or the like), label(s), tag(s), and/or the like.

The organizational resources 114 may be configured to manage organizational objects 115, which may include, but are not limited to: users, user objects, user profiles, user groups, roles, organizations, organizational units, user access controls, access control lists (ACLS), directory entries, directory containers, and/or the like. The analytic resources 116 may comprise analytic objects 117 configured to analyze, visualize, and/or otherwise process resource objects 111, such as data objects 113, organizational objects 115, other analytic objects 117, and/or the like. An analytic object 117 may include, but is not limited to: a data processing facility, a data access facility, a data conversion facility, a data analytic facility (e.g., a key performance indicator library), a data visualization facility, a graphics facility, an annotation facility, a data filtering and/or selection facility, a data card, a card page, and/or the like. A "data card" refers to a collection of one or more analytic objects 117 configured to implement particular analytic and/or virtualization operations pertaining to a data set. In FIG. 1, data cards are depicted as separate analytic objects (data card objects, or data cards 118). Data cards 118 may be managed by an analytic resource 116 with one or more other analytic objects 117. The disclosure is not limited in this regard, however, and, in some embodiments, data cards 118 may be represented as analytic objects 117 and/or other type of resource objects 111 separate from the analytic objects 117 (e.g., managed and/or implemented by a dedicated business intelligence and/or analytics layer).

The MCS 120 may be configured to manage a nested thread model for online collaboration and/or communication by use of, inter alia, a messaging store 140. The messaging store 140 may comprise any suitable device, system, and/or apparatus for managing the storage and retrieval of data, such as a non-volatile storage device, non-volatile storage system, cache device, database system, file system, and/or the like. The messaging store 140 may be configured to store persistent data pertaining to the online collaboration and/or messaging systems and methods disclosed herein. By way of non-limiting example, the messaging store 140 may comprise one or more channel records 150, thread records 160, message sequence records 170, message records 180, user records 190, and so on. Although particular embodiments of data records for managing online messaging and collaboration are described herein (and illustrated in FIG. 1), the disclosure is not limited in this regard, and could be adapted to use any suitable data and/or persistence model for implementing the nested threaded models for online collaboration and/or messaging disclosed herein.

In the FIG. 1 embodiment, channel records 150 may be configured to define respective channels. As used herein, a "channel" refers to a construct for managing online collaboration and/or messaging pertaining to a particular point of interest (POI). A channel record 150 may include, but is not limited to: channel metadata 151, POI data 152 (and/or a POI anchor 154), access data 156, channel content 158, and/or the like. Channel metadata 151 may comprise any suitable information pertaining to a channel which may include, but is not limited to: a channel name, a channel label, a channel alias, a channel description, channel preferences, a unique identifier, and/or the like.

The POI data 152 of a channel record 150 may define and/or specify the point of interest of the channel. The POI data 152 may comprise any suitable content for defining, specifying and/or describing a POI including, but not limited to: text content, multimedia content, structured content, resource object(s) 111, and/or the like (e.g., executable content, script content, network-accessible content, and so on). In some embodiments, the POI of the channel record 150 may comprise and/or correspond to resource objects 111, such as a data object 113, organizational object 115, analytic object 117 (data card 118), and/or the like. In such embodiments, the POI data 152 of the channel record 150 may comprise a POI anchor 154, which may comprise a link, reference, and/or otherwise specify a resource object 111 pertaining to the POI of the channel. In some embodiments, a channel record 150 may comprise POI data 152 and a POI anchor 154. The POI data 152 may describe the POI of the channel (provide a name, description, and/or the like), and the POI anchor 154 may specify a resource object 111 that corresponds to the POI. For example, a channel record 150 may define a channel for an "engineering" group of an organization. The POI data 152 of the channel record 150 may comprise a description of the channel (e.g., "Engineering group discussion"), and the POI anchor 154 may reference a resource object 111 corresponding to the engineering group (an organizational object 115 that represents the "engineering" organizational unit managed by the organizational resources 114). In another example, a channel record 150 may be defined for a particular data set and/or data analytic (e.g., a data card 118 configured to track sales of a particular product X within different regions). The POI data 152 of the channel record 150 may describe the data card 118 (e.g., "Sales of product X"), and the POI anchor 154 of the channel record 150 may reference the underlying resource object(s) 111 (e.g., reference the data card 118 of the analytic resources 116 and/or corresponding data objects 113 managed by the data resources 112).

The access data 156 of the channel record 150 may specify users that are authorized to access the channel (and/or enumerate the rights of particular users). In some embodiments, the access data 156 of a channel record 150 may define a recipient list for the channel (e.g., list users authorized to access the channel by distinguished name, email address, or the like). The access data 156 may comprise an access control list (ACL) that specifies the rights of various users to administer the channel (e.g., invite new users, create threads, etc.), manage the content of the channel (e.g., rights to view, create, edit, and/or delete message content), and so on.

In some embodiments, the access data 156 of a channel record 150 may be derived from and/or reference access control information of one or more resource objects 111. In such embodiments, the access data 156 may reference access control data of the corresponding resource objects 111 (as opposed to defining redundant access control metadata for the channel). As disclosed above, the POI of a channel record 150 may correspond to a resource object 111, which may be referenced by the POI anchor 154 of the channel record 150. In such embodiments, access to the channel may be predicated on access to the resource object 111, which may obviate the need for defining separate access data 156 for the channel record 150. For example, the access data 156 for a channel record 150 defined for the "engineering" organizational unit may leverage the access control list of the "engineering" organizational object 115 managed by the organizational resources 114 (e.g., directory server). Access rights to the "engineering" channel may, therefore, be delegated to the organizational resources 114. Changes to access rights defined by the "engineering" organizational object 115 may automatically be applied to the corresponding channel (and threads). For example, a user may leave the "engineering" group, which may result in the user being removed from an "engineering" organizational object 115 (or having corresponding access rights revoked). Since the access data 156 of the channel record 150 references the "engineering" organizational object 115 (as opposed to defining a separate access control list), the user "automatically" loses access to the channel (and corresponding threads), without the need for a separate update to the channel record 150. Similarly, when a user is added to the "engineering" group, the user may be granted access to the corresponding "engineering" channel automatically, without the need for a separate update to the channel record 150. Access rights for a channel record 150 may be controlled by other resource objects 111. In another embodiment, access to a channel defined by a channel record 150 having a POI anchor 154 that references a particular data card 118 and/or data object 113 may be controlled by access rights to the particular data card 118 (managed by the analytic resources 116) and/or data object 113 (managed by the data resources 112).

The channel content 158 of a channel record 150 may comprise and/or reference contents of the channel. The contents of a channel may include a message sequence comprising one or more messages. In the FIG. 1 embodiment, the channel content 158 references a message sequence record 170 (as described in further detail herein), which may correspond to one or more message records 180.

As disclosed above, messages pertaining to a "sub-topic" of a channel may be managed as "threads." As used herein, a "thread" refers to a construct for managing online collaboration and/or messaging that a) pertains to a defined POI, and b) is grouped under a parent channel (e.g., is classified as a thread of a "parent" channel). Threads may be defined by respective thread records 160. A thread record 160 may include thread metadata 161, a channel reference 163, POI data 162 (which may include a POI anchor 164), access data 166, thread content 168, and so on. The thread metadata 161 of a thread record 160 may comprise any suitable information pertaining to a thread, which may include, but is not limited to: a thread name, a thread label, a thread alias, a thread description, an identifier, and/or the like. The channel reference 163 may comprise a reference and/or link to the channel record 150 corresponding to the "parent" channel of the thread.

The POI data 162 may define and/or specify the point of interest of the channel, and the POI anchor 164 may reference one or more reference object(s) 111, as disclosed herein. In some embodiments, the thread record 160 may inherit portions of the POI data 162 and/or POI anchor 164 of the parent channel record 150. Alternatively, or in addition, the POI data 162 and/or POI anchor 164 of the thread record 160 may differ from the POI data 152 and/or POI anchor 154 of the parent channel record 150. For example, a thread record 160 may be created under the channel record 150 for the "engineering" channel, disclosed above. The thread record 160 may be defined for messages related to a project in which the engineering team is engaged (e.g., "release of product 3.0"). The POI anchor 164 of the thread record 160 may inherit the POI anchor 154 of the parent channel record 150, such that the thread record 160 references the "engineering" organizational object 115 (along with corresponding access controls). The POI data 162 of the thread record 160 may differ from the POI data 152 of the parent channel record 150, and may specify and/or describe the engineering project to which the thread pertains. In another embodiment, a thread record 160 may be defined to facilitate collaboration regarding a data analytic (e.g., a particular data card 118 and/or data object 113). In some embodiments, the POI anchor 164 of the thread record 160 may differ from the POI anchor 154 of the parent channel record 150. The POI anchor 164 of the thread record 160 may, for example, reference a variation of the data card 118 and/or subset (or other refinement) to the data object 113. The POI anchor 164 may, for example, specify a variation to one or more of the data specification, parameter specification, analysis specification, and/or visualization specification, of the data card 118, as disclosed in further detail herein). In another example, the POI anchor 164 may comprise one or more criteria to further filter and/or select data of a data object 113.

Access data 166 of the thread record 160 may specify users that are authorized to access the thread (and define corresponding access rights for the users), as disclosed herein. In some embodiments, thread records 160 may inherit the access data 156 of their parent channel records 150. Accordingly, threads of a channel may be created without "redefining" the recipients (and/or access controls). The user or users that are authorized to receive and/or administer the thread (the ACL) may be inherited from the parent channel record 150. Alternatively, or in addition, access rights to the thread may be controlled by the resource object 111 to which the parent channel is anchored (e.g., access to a thread may be controlled by user access rights to one or more of a data object 113, organizational object 115, and analytic object 117 (and/or data card 118) to which the parent channel of the thread is anchored). Accordingly, in some embodiments, thread records 160 may not include access data 166 and instead may rely on access data of a parent channel record 150 and/or access controls pertaining to resource object(s) anchored to the parent channel record 150.

In some embodiments, a thread record 160 may comprise access data 166, which may differ from the access data 156 of the corresponding parent channel record 150. In some embodiments, the access data 166 of a thread record 160 may limit restrict user access relative to the parent channel.

In some embodiments, the access data 166 of a thread record 160 may include a sub-set of the users included in the access control list (ACL) and/or restrict rights of one or more users relative to the access data 166 of the parent channel record 150. Alternatively, or in addition, a thread may modify access controls "inherited" from a resource object 111 to which the parent channel record 150 is anchored. For example, a thread may be created to discuss "management issues" pertaining to the engineering group or an organization. A thread record 160 for the thread may reference a channel record 150 for the existing "engineering" group channel. The channel record 150 may be anchored to the "engineering" organizational object 115 of the organizational resources 114, which may be used to control access to the channel, as disclosed above. The "management issues" thread may be intended for a subset of users in the engineering group (e.g., managers in the engineering group). If the thread record 160 were to inherit the access controls used by the parent channel record 150, unchanged, non-managers in the engineering group could be given access to the "management issues" thread. The thread record 160 created for the "management issues" thread may, therefore, comprise access data 166 that differs from the access data 156 of the parent channel record 150. The access data 166 of the thread record 160 may limit access relative to the parent channel record 150 by, inter alia, anchoring the thread record 160 to a different organizational object 115 (e.g., a "management" organizational object 115 under the "engineering" organizational object 115) and/or defining additional filtering and/or selection criteria for access to the thread, which may comprise restricting access to: a) users that are members of and/or have access to the "engineering" organizational object 115 (per the parent channel record 150), and b) have the role of "manager" (and/or have access to an "engineering managers" organizational object 115).

The thread content 168 may comprise and/or reference contents of the thread. In the FIG. 1 embodiment, the channel content 158 references a message sequence record 170 (as described in further detail herein), which may correspond to one or more message records 180.

The content of a channel and/or thread may comprise one or more messages (e.g., a sequence of messages). As used herein, a "message" refers to any content capable of being communicated, rendered, displayed, played, presented, executed, interpreted, recorded and/or processed by a computing device. A message may include, but is not limited to: content, text content, structured content (e.g., content that complies with a particular markup and/or formatting specification, such as hypertext markup language (HTML), XML, or the like), multimedia content, audio content, video content, image, executable content (e.g., application content), interpretable content (e.g., script content), object content (embedded objects), content references (e.g., a hyper-text transport protocol (HTTP) link), a resource object 111, a data object 113, an organizational object 115, an analytic object 117, a data card 118, and/or the like.

A message sequence record 170 may define a message sequence of a particular channel and/or thread. As used herein, a "message sequence" refers to an ordered sequence of messages. The messages of a message sequence may be ordered in accordance with one or more ordering criteria, including, but not limited to: submission time, authoring time, edit time, author, editor, read status, relevance metrics, content-relevance metrics, user-relevance metrics, and/or the like. In the FIG. 1 embodiment, a message sequence record 170 includes metadata 171 and message references 172 and 174. The metadata 171 of a message sequence record 170 may comprise information pertaining to the message sequence, which may include, but is not limited to: an identifier, an alias, and so on. The message sequence metadata 171 may further include a reference, link, and/or identifier of the channel or thread record 150, 160 to which the message sequence record 170 pertains. In some embodiments, the metadata 171 may further include metrics, which may correspond to activity in the particular channel or thread (e.g., frequency at which new messages are being submitted), the number of users actively subscribed to the channel or thread, rate at which messages are being read by users, relevance metrics, and so on.

The message references 172 and 174 may reference respective message records 180. The message reference 172 may correspond to a first message in the sequence (e.g., the "head" of the message sequence), and the message reference 174 may correspond to a last message in the sequence (e.g., the "tail" of the message sequence).

Messages submitted to the channels and/or threads disclosed herein may be embodied as respective message records 180. A message record 180 may include one or more of: message metadata 181, index data 183, content item(s) 184, content attributes 185, a message anchor 186, and so on. The message metadata 181 may comprise any suitable information pertaining to a message, such as the author of the message, editor(s) of the message, submission time of the message, edit time(s), access metrics (e.g., distribution count, read count, etc.), and/or the like. In some embodiments, the message metadata 181 may specify the message sequence, channel, and/or thread to which the message pertains. The message metadata 181 may reference one or more of a channel record 150, a thread record 160, and a message sequence record 170.

The content item(s) 184 of the message record 180 may comprise one or more content items, each content item comprising content capable of being communicated, rendered, displayed, played, presented, executed, interpreted, recorded and/or processed by a computing device including, but not limited to: text content, structured content (e.g., content that complies with a particular markup and/or formatting specification, such as hypertext markup language (HTML), XML, or the like), multimedia content, audio content, video content, image, executable content (e.g., application content), interpretable content (e.g., script content), object content (embedded objects), content references (e.g., a hyper-text transport protocol (HTTP) link), and/or the like. The attributes 185 may specify attributes of respective content items 184. The attributes 185 may include a content-type attribute 185, which may be used to present and/or render a content item 184 on a computing device (e.g., present the content item 184 to a user through human-machine interface components of a computing device). By way of non-limiting example, a content-type attribute 185 may specify that a text content item 184 corresponds to a particular syntax or markup format (e.g., computer code, HTML, or the like). The content-type attribute 185 may be used to render the text content item 184, which may comprise rendering computer code with appropriate spacing, tabulation, and/or highlighting, implementing markup directives of HTML content, and/or the like.

In some embodiments, the content-type attribute 185 of a content item 184 may specify a handler for the content item 184. For example, the content-type attribute 185 may specify that the content item 184 comprises and/or references a resource object 111, such as a data card 118 corresponding to an analytic resource 116. In response, the content item 184 may be rendered by use of the analytic resource 116 associated with the data card 118 (e.g., by use of the data set, data specification, parameter specification, analytic specification, and/or visualization specification of the data card 118, as disclosed in further detail herein). Rendering the content item 184 may, therefore, present current analytics and/or visualization of the data card 118.

In some embodiments, the message metadata 181 may further comprise index data 183. The index data 183 may comprise data extracted from one or more of the message metadata 181, message content items 184, attributes 185, and so on. The index data 183 may be used to index and/or categorize the message and may include, but is not limited to: a) users referenced by the message, b) resource object(s) 111 referenced by the message (e.g., references to particular data object 113, organizational objects 115, analytic objects 117, data cards 118, and/or the like), c) key words or phrases included in the message, and/or the like.

The attributes 185 may further comprise metrics pertaining to the message, which may include, but are not limited to: access metrics (e.g., number of unique views of the message), view metrics (e.g., amount of time message displayed to various users and/or viewable in application interface), read metrics (e.g., number of times the message is confirmed to have been read), action metrics (e.g., rate at which users perform an action or task requested by the message), and/or the like.

As disclosed above, the MCS 120 may comprise a collaboration engine 127, which may be configured to interface with resources 110 and/or the resource objects 111 managed thereby, which may include, but are not limited to: data objects 113 managed by one or more data resources 112, organizational objects 115 managed by one or more organizational resources 114, analytic objects 117 (and/or data cards 118) managed by one or more analytic resources 116, and/or the like. The collaboration engine 127 may comprise a reference manager 128, which may be configured to manage references to resource objects 111 in respective channel records 150, thread records 160, message records 180, and/or the like. The reference manager 128 may be configured to translate names used to reference resource objects 111 by the MCS 120 to respective namespace(s) used by the corresponding resource(s) 110 (e.g., data resources 112, organizational resources 114, analytic resources 116, and so on). The reference manager 128 may be configured to, inter alia, convert a reference to a data object 113 into a name and/or naming format of a particular data resource 112 (e.g., an SQL statement, stored procedure, XPath, or the like), convert a reference to an organizational object 115 into a name and or naming format of a particular organizational resource 114 (e.g., an LDAP distinguished name), convert a reference to an analytic object 117 (and/or data card 118) for a particular analytic resource 116, and so on.

The collaboration engine 127 may further comprise an access manager 129 which may be configured to perform operations pertaining to the resource objects 111 by use of respective resources 110. The access manager 129 may be configured to access the analytic resources 116 to process and/or modify analytic objects 117, such as data cards 118, which may comprise configuring the analytic resources 116 to produce a quantitative data outputs for specified analytic objects 117 (and/or data cards 118), generate visualizations corresponding to specified analytic objects 117 (and/or data cards 118), and so on.

In some embodiments, the collaboration engine 127 may be configured to automatically create channels corresponding to one or more resource objects 111. The collaboration engine 127 may be configured to create channel records 150 corresponding to data object(s) 113 being created (and/or imported) into the data resources 112. For example, the collaboration engine 127 may create a channel record 150 for a channel pertaining to a new data set pertaining to "sales of product Y" in the data resources 112. Creating the channel record 150 may comprise a) specifying POI data 152 indicating that the channel pertains to the new data set, b) anchoring the channel record 150 to the data set (e.g., to the data object(s) 113 comprising the data set), and c) defining and/or inheriting access data 156 from the referenced data object(s) 113. In other embodiment, the collaboration engine 127 may be configured to create a channel record 150 in response to creation of a new organizational object 115 (e.g., creation of a "new department" organizational object 115). Creating the channel record 150 may comprise specifying a POI data 152 indicating that the channel pertains to the "new department," anchoring the channel record 150 to the "new department" organizational object 115 by use of the POI anchor 154, importing and/or referencing access controls of the of the new organizational object 115, and so on. The collaboration engine 127 may be further configured to create channel records 150 to define channels corresponding to analytic objects 117, such as data cards 118. In response to creation of a data card 118, the collaboration engine 127 may create a corresponding channel record 150, as disclosed above, which may include referencing the data card 118 in the channel record 150 by use of the POI anchor 154 of the channel record.

The collaboration engine 127 may be further configured to create channels in response to a request (e.g., a request 131 received via the electronic communication network 102). The request 131 may specify a POI for the channel and/or comprise channel metadata, such as a channel name, description, alias, and/or the like. The request 131 may be used to define channel metadata 151 and/or POI data 152 of a channel record 150 for the channel. The request 131 may not be anchored to a resource object 111 and may not comprise a POI anchor 154 and/or inherit access data 156. In some embodiments, the request 131 may specify access controls for the channel (e.g., information from which access data 156 for the channel record 150 may be derived), such as channel recipients, an ACL, channel access type (e.g., public, by invite, private), and/or the like. A "public" channel may be accessible to any user. A channel designated as "by invite" may be accessible to users invited other uses of the channel (e.g., invited by the channel creator, or users subsequently invited to join the channel). A "private" channel may only be accessible to specified users (e.g., in an ACL managed by the channel creator or administrator).

Users that have joined a channel may view messages of the channel, submit new messages to the channel, create threads of the channel, and so on. The collaboration engine 127 may be further configured to manage creation of a thread of a channel. Creating a thread for a channel may comprise a) creating a thread record 160 defining the thread, b) linking the thread record 160 to the channel record 150 of the "parent" channel for the thread, c) importing and/or inheriting the recipients of the parent channel (e.g., importing and/or inheriting access data 156 of the parent channel record 150 in the thread record 160), and so on. Importing and/or inheriting the access data 156 of the parent channel record 150 may comprise a) importing access data 166 from the channel record 150 into the access data 166 of the thread record 160, b) modifying the access data 156 imported from the parent channel record 150, c) using the access data 156 of the parent channel record 150 to control access to the thread, and/or the like.

The MCS 120 may further comprise a messaging server 130, which may be configured to provide messaging and/or collaboration content to users. In some embodiments, users may access the MCS 120 by use of an application 136 operating on a client computing device 104. The client computing device 104 may comprise any suitable computing device including, but not limited to: a portable computing device, a mobile computing device, a smart phone, a personal digital assistant, a tablet computing device, a personal computing device, a desktop computing device, a server computing device, a virtual computing device, and/or the like. The client computing device 104 may comprise a processor 105, memory 106, non-transitory storage 107, a communication interface 108, human-machine interface components 109, and/or the like.

The computing device 104 may comprise an application 136 configured to access the MCS 120 (and/or the messaging and collaboration services provided thereby). The application 136 may comprise instructions stored on the non-transitory storage 107 of the computing device 104. The instructions may be loaded into the memory 106 for execution by the processor 105. The application 136 may be configured to present an interface 138 of the MCS 120 on a display of the computing device 104. In some embodiments, the application 136 may be configured to access the MCS 120 via the electronic communication network 102. The application 136 may comprise a browser application, and the interface 138 presented thereby may be generated by an interface engine 132 of the messaging server 130. Alternatively, or in addition, the application 136 may comprise a dedicated messaging and collaboration client application of the MCS 120.

In the FIG. 1 embodiment, the application 136 may access the MCS 120 by, inter alia, establishing a communication link to the messaging server 130 via the electronic communication network 102 (e.g., a persistent, two-way communication channel). Alternatively, or in addition, the application 136 may access the MCS 120 by, inter alia, issuing requests 131 to the messaging server 130 via the electronic communication network 102, receiving (and processing) responses 133 from the messaging server 130. The application 136 may be configured for request messaging and/or collaboration operations including, but not limited to: a) create channels and/or threads, as disclosed herein, b) subscribe to specified channels or threads, c) access a messaging and collaboration interface 138 for displaying channels and/or threads to which the user is subscribed, view content of specified channels and/or threads, author and/or edit content of specified channels and/or threads, and so on.

As used herein, "subscribing" to a channel and/or thread refers to selecting a channel and/or thread to display within the messaging and/or collaboration interface 136. A user may subscribe to a channel or thread by, inter alia, issuing a request 131 to subscribe to a specified channel and/or thread to the messaging server 130. The messaging server 130 may determine whether the user is authorized to access the specified channel and/or thread and, if so, may execute the subscribe request, which may comprise displaying the specified channel and/or thread in the interface 138 presented to the user.

In some embodiments, the MCS 120 may maintain user records 190, which may be configured to, inter alia, specify the channels and/or threads to which the user has subscribed. A user record 190 may comprise a user profile 191, subscription data 192, and messaging preferences 196. The user profile 191 may comprise information pertaining to the user, such as a user identifier, a user name, a distinguished name, contact information (e.g., email address), authentication credentials, and/or the like. In some embodiments, a user record 190 may correspond to an organizational object 115 managed by the organizational resources 114 (e.g., a user object, profile, record, or the like). In such embodiments, the user profile 191 may comprise a user reference 194 configured to anchor the user profile record 190 to the corresponding organizational object 115. User profile information for the user may be imported and/or referenced from the referenced organizational object 115.

The subscription data 192 may identify the channels and/or threads to which the user has subscribed. The subscription data 192 may reference one or more channel records 150, thread records 160, and/or the like. A user may be subscribed to a specified channel or thread by, inter alia, verifying that the user is authorized to access the specified channel or thread (e.g., by comparing the user record 190 and/or corresponding organizational object 115 to access data 156 of the specified channel or thread), and b) updating the subscription data 192 of the user to include a reference to the specified channel or thread.

The messaging preferences 196 may comprise information to prioritize and/or order channels, threads, and/or messages. The messaging preferences 196 may specify keywords that are of interest to the user; other users in which the user is interested; resource objects 111 the user is interested in following (e.g., particular data objects 113, organizational objects 115, analytic objects 117, data cards 118, and/or the like); filter, selection, and/or preference criteria pertaining to the channels, threads, and/or messages; and so on. The messaging preferences 196 may comprise information specified and/or defined by the user. Alternatively, or in addition, the messaging preferences 196 may include information derived from the user profile 191, such as the organizational unit to which the user belongs, role(s) assigned to the user, tasks assigned to the user, activity of the user (e.g., messages read by the user), and so on.

The analytic engine 139 of the messaging server 130 may be configured to compare messaging preferences 196 of the user to channels, threads, and/or messages, and assign corresponding priority and/or relevance metrics thereto. The metrics may comprise user-relevance metrics that correspond to channel, threads, and/or messages that reference the user (or user(s) specified by the messaging preferences 196), content-relevant metrics, which may indicate whether the channel, thread, and/or message corresponds to keywords, reference object(s) 111 and/or the like, specified in the messaging preferences 196, and so on.

The messaging server 130 may comprise an interface engine 132, which may be configured to generate a messaging and collaboration interface 138 for the user. The messaging and collaboration interface 138 may identify channels and/or threads to which the user has subscribed. The interface engine 132 may comprise a real-time nested thread modeler 134, which may be configured to display, arrange, and/or configure channels and/or threads within the messaging and collaboration interface 138 to, inter alia, a) group threads under the parent channel(s) thereof, b) associate threads with the parent channels thereof, c) visually anchor threads to parent channels (independent of the content of the parent channels), and so on. The real-time nested thread modeler 134 may be further configured to coordinate creation and/or management of channels and/or threads as disclosed herein, which may comprise a) associating threads with respective channels (e.g., anchoring thread records 160 to respective channel records 150), b) incorporating access data 156 (e.g., recipient lists, ACLs, access controls, and so on) of parent channels to control access to threads created under respective parent channels, c) refining access data 156 used to control access to threads created under respective parent channels (e.g., establish thread access data 166 based on inherited channel access data 156), d) referencing "master access control" information for channels and/or threads based on resource objects 111 anchored to the channels and/or threads, and so on, as disclosed herein. The real-time nested thread modeler 134 may be further configured to route messages submitted to various channels and/or threads to users currently accessing the channels and/or threads (e.g., users that have selected the channels and/or threads in the RTN interface 238, disclosed herein).

The interface engine 132 may be configured to generate interface(s) to display, manipulate, and/or control channels and/or threads based on the channel/thread associations maintained by the real-time nested thread modeler 134. In some embodiments, channels and/or threads may be ordered in the interface 138 and/or 238 based on metrics determined by the analytic engine 139 of the messaging server 130, as disclosed herein.

Figure 2A:
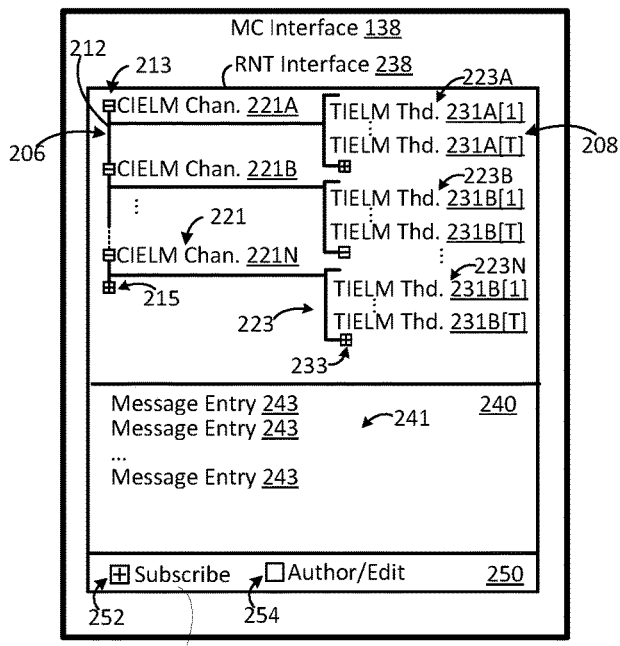
FIGS. 2A-J depict embodiments of interfaces for online collaboration and/or messaging.

FIGS. 2A-2I depict embodiments of a messaging and collaboration interface 138 produced by the messaging server 130 and/or presented on the client computing device 104. The messaging and collaboration interface 138 may include a Real-Time Nested Thread (RNT) interface 238, which may display channels and/or threads to which the user has subscribed. As illustrated in FIG. 2A, the user of the messaging and collaboration interface 138 may be subscribed to a plurality of channels, including channels 221A-N. The channels 221A-N may be represented in the interface by respective channel interface elements (CIELM), including respective CIELM for channels 221A through 221N. Threads associated with the channels 221A-N may be represented by respective thread interface elements (TIELM) including TIELM representing threads 231A[1] through 231A[T] grouped under channel 221A, TIELM representing threads 231B[1] through 231B[T] grouped under channel 221B, and so on, with TIELM representing threads 231N[1] through 231N[T] representing threads under channel 221N.

The interface may comprise a thread display control 213 to selectively hide and display the threads associated with respective channels. As illustrated in FIG. 2A, the thread display control 213 of for each channel 221A-N has been expanded (as indicated by the "−" symbol therein). A channel expand control 215 may indicate whether there are other channels available to display beyond that last channel displayed in the RNT interface 238 (channel 221N). The "+" symbol of the channel expand control 215 may indicate that additional channels are available.

As disclosed above, the RNT interface 238 may be configured to visually anchor threads to the channels associated therewith. Threads may be presented within respective thread display areas 223, which may be visually anchored to respective channels: threads associated with channel 221A may be displayed in a thread display area 223A that is visually anchored to the CIELM for channel 221A, threads associated with channel 221B may be displayed in a thread display area 223B that is visually anchored to the CIELM for channel 221B, and so on with the threads associated with channel 221N being displayed in a thread display area 223N that is visually anchored to the CIELM for channel 221N. The RNT interface 238 may limit the number of threads initially displayed in the respective thread display areas 223A-N to a particular number (T). The thread display areas 223A-N may comprise respective thread expand controls 233, which may indicate whether additional threads are available under the corresponding channel 221A-N. The thread expand controls 233 of thread display areas 223A and 223N comprise a "+" symbol, indicating that additional threads may be displayed under the respective channels 221A and 221N. The thread expand control 233 of thread display area 223B may comprise a "−" symbol, indicating that all of the threads under channel 221B are currently being displayed.

The MC interface 138 may further comprise a content display area 240, which may be configured to display message content corresponding to selected channels and/or threads. As illustrated in FIG. 2A, the content display area 240 may be configured to display a portion of a message sequence 241 (as respective message entries 243) of a selected channel or thread. The message entries 243 may comprise content items 184 of respective message records 180 rendered according to attributes 185 pertaining to the content items 184.

The MC interface 138 may further include control elements 250, such as a subscribe control 252, an author/edit control 254, and so on. The subscribe control 252 may provide for subscribing the specified channels and/or threads. Selection of the subscribe control 252 may cause a subscribe interface 253 to be displayed, which may list channels and/or threads available for subscription by the user. The channels 255 and/or threads 257 listed in the subscribe interface 253 may include, but are not limited to: publically accessible channels and/or threads, channels and/or threads to which the user has been invited, channels and/or threads that the user is authorized to access (based on access controls of resource objects 111 anchored to the respective channels and/or threads), and so on. The subscribe interface 253 may be generated by the messaging server 130, which may order, arrange, and/or present the channels 255 and/or threads 257 within the subscribe interface 253 based on a priority metrics assigned thereto by the analytic engine 139 of the messaging server 130. The subscribe interface 253 may comprise controls for identifying channels 255 and/or threads 257 for subscription, and a submit control to subscribe to the identified channels/threads.

Figure 2B:
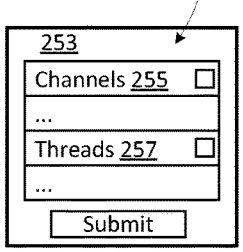
Figure 2B:
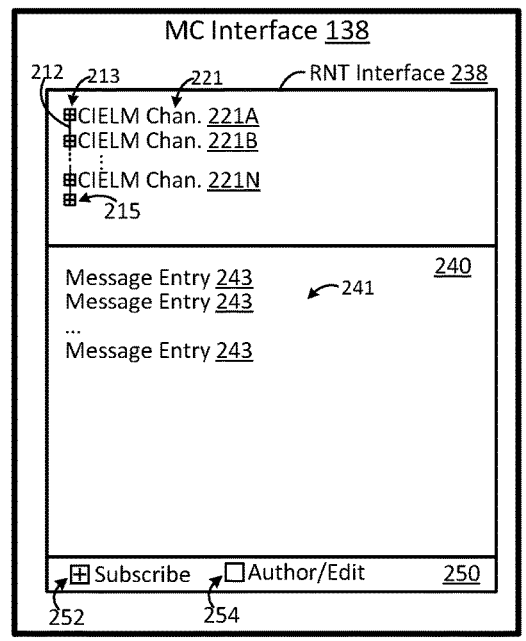

FIG. 2B illustrates an embodiment of the RNT interface 238 in which the thread display controls 213 for each channel 221A-N have been set to "hide" the threads associated therewith. Accordingly, the thread display areas 223 of the channels 221A-N are removed from the RNT interface 238.

Figure 2C:
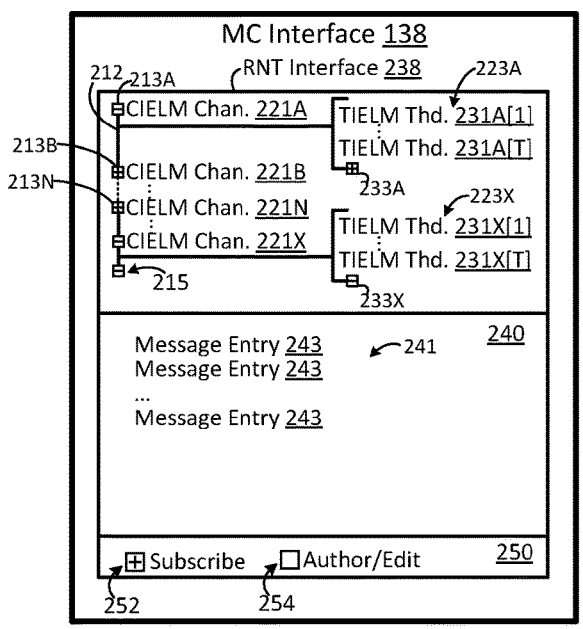

FIG. 2C illustrates an embodiment of the RNT interface 238 in which the channel expand control 215 has been selected to display additional channels pertaining to the user. Selection of the channel expand control 215 may result in displaying additional channels to which the user has subscribed, including channels 221A through 221X (as opposed to 221A through 221N). In the FIG. 2C embodiment, the channel expand control 215 indicates that no further expansion is possible by use of the "−" symbol. In addition, the thread display controls 233A and 233X of channels 221A and 221X have been selected, resulting in the thread display areas 223A and 223X being display in the RNT interface 238 (and being visually anchored to the CIELM of channels 221A and 221X, respectively). The thread expand control 233A indicates that additional threads under channel 221A are available for display, and the thread expand control 233X indicates that all available threads of channel 221X are currently being displayed.

Figure 2D:
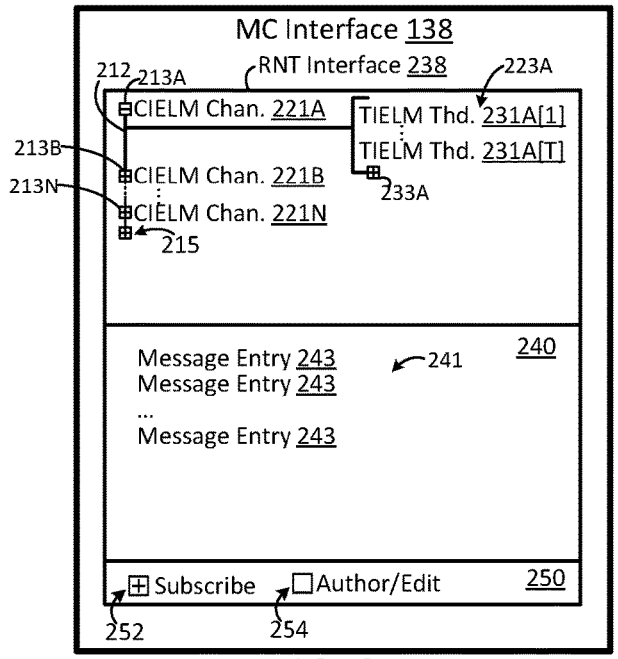
Figure 2E:
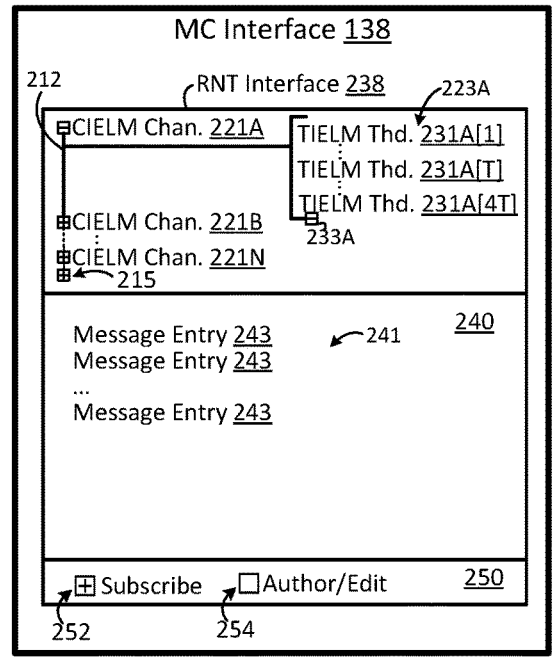

In the FIG. 2D embodiment, the thread display control 213A is selected, and thread display controls 213B and 213N are unselected (set to hide threads grouped under channels 221B and 221N). As such, the RNT interface 238 comprises a thread display area 223A visually anchored to the CIELM for channel 221A (and without thread display areas 223 for the other channels 221B through 221N). A disclosed above, the RNT interface 238 may be configured to initially display a limited number of threads (T), and the thread display area 223A may comprise a thread expand control 233A to indicate the availability of additional threads under channel 221A. Selection of the thread expand control 233A may cause the RNT interface 238 to display additional threads in the visually anchored thread display area 223A (e.g., an additional T threads). FIG. 2E depicts an embodiment in which the thread expand control 233A has been selected to display threads 231A[1] through 231A[4T] under channel 221A (the thread expand control 233A has been "expanded" three times). The thread expand control 233A may indicate that there are no more threads available to display beyond thread 231A[4T]. The thread expand control 233A may further provide for "contracting" the number of threads displayed in the thread display area 223A, "contracting" the thread expand control 223 may result in reverting from displaying threads 223A[1] through 223A[4T] to displaying the threads 223[1] through 223A[T] (without "contracting" multiple times, as per the operations to expand the thread display 223A).

Figure 2F:
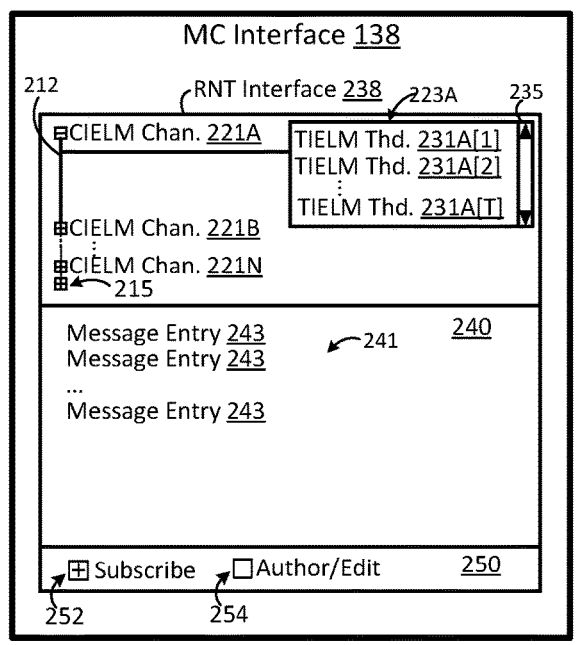
Figure 2G:
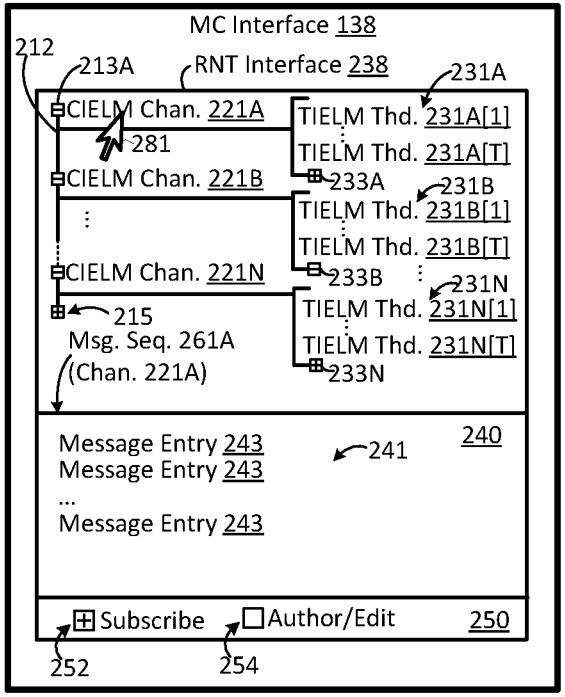

FIG. 2F depicts an alternative mechanism for a thread display area 223A that is visually anchored to a corresponding channel 221A in the RNT interface 238. In the FIG. 2F embodiment, the thread display area 223A comprises a scroll control 235 which may be used to scroll through the threads 221A[1] through 231A[4T] of channel 221A.

As disclosed above, the MC interface 138 may comprise a content display area 240, which may be configured to display, inter alia, messages pertaining to a selected channel or thread. The messages displayed in the content display area 240 may correspond to the channel or thread corresponding to a selected CIELM and/or TIELM displayed in RNT interface 138. In the FIG. 2G embodiment, a user selection 281 specifies CIELM of channel 221A. In response, the MC interface 138 updates the content display area 240 to display message entries 243 corresponding to the message sequence 261A of channel 221A. The content display area 240 may update in real-time as messages are submitted to the channel 221A (by other users). In addition, content authored by use of the author/edit controls 254 may be submitted as messages and/or message content of channel 221A (may be appended to the message sequence 261A of channel 221A).

Figure 2H:
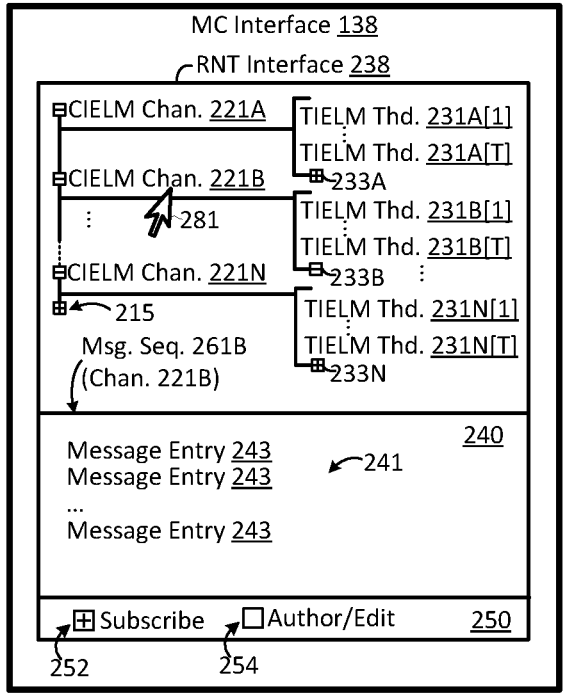
Figure 2I:
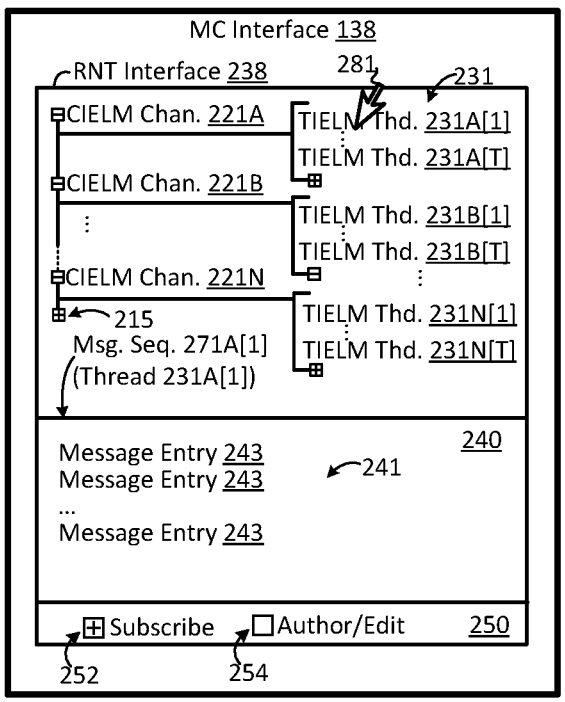
Figure 2J:
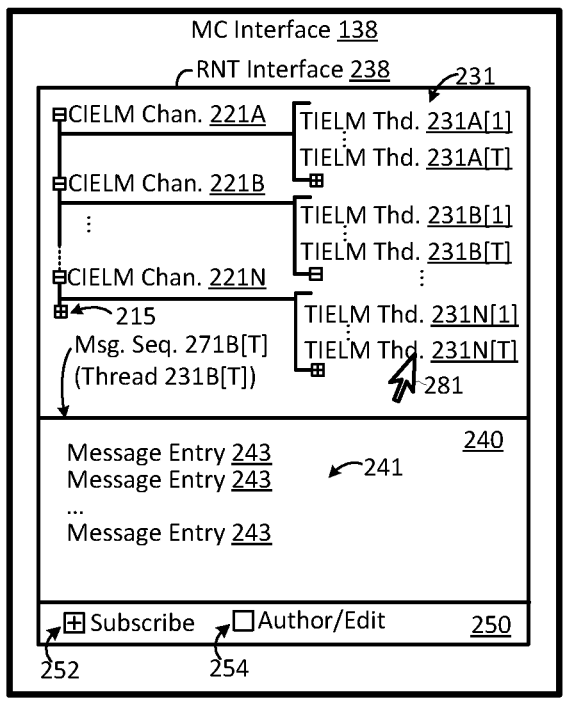

In the FIG. 2H embodiment, a user selection 281 specifies CIELM of channel 221B and, as such, the content display area 240 is updated to display the message sequence 261B of channel 221B (and is updated in real-time as messages are appended to the message sequence 261B of channel 221B). In FIG. 2I, the user selection 281 specifies a TIELM of thread 231A[1], which causes the content display area 240 to display the message sequence 271A[1] of thread 231A[1] (and be updated in real-time with content submitted to thread 231A[1]). Similarly, the author/edit controls 254 may be configured to author message content to be appended to thread 231A[1]. In the FIG. 2J embodiment, the user selection 281 selects TIELM of thread 231N[T], which results in the content display area 240 presenting the message sequence 271B[T] of thread 231N[T], configuring the application 136 and/or MC interface 138 to respond to message content submitted to thread 231N[T], and so on, as disclosed herein.

Figure 3A:
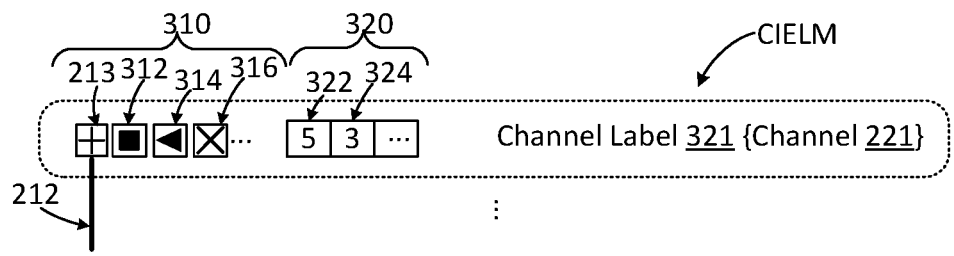
FIGS. 3A-B depict embodiments of interface elements representing channels and/or threads according to the disclosed nested thread model.

FIG. 3A depicts embodiments of an channel interface element (CIELM) as disclosed herein. The CIELM of FIG. 3A may comprise channel controls 310, channel metrics 320, a channel label 321, and so on, of a particular channel 221. The channel label 321 of the CIELM may comprise a text name, alias, description, and/or other information identifying the channel 221.

The channel controls 310 may include, but are not limited to: a thread display control 213, a channel select control 312, a POI reference control 314, and an unsubscribe control 316. The thread display control 213 may selectively display and hide threads associated with the channel (in a visually anchored display area), as disclosed herein. The channel select control 312 may be used to select the channel as the "active" channel of the RTN interface 238, such that the content display area 240 displays messages of the channel and is updated with messages submitted to the channel, authored content is submitted to the channel, and so on, as disclosed herein. The POI reference control 314 may comprise a link to a resource object 111 to which the channel is anchored. Selecting the POI reference control 314 may cause a display interface for the resource object 111 to be displayed (within the interface 138 and/or in a separate display interface). As disclosed in further detail herein, selecting a POI reference control 314 that corresponds to a data card 118 may cause corresponding analytic and/or visualization data to be displayed. The unsubscribe control 316 may enable a user to unsubscribe from the channel corresponding to the CIELM, which may remove the channel from the RTN interface 238.

The channel metrics 320 may include, but are not limited to: an unread count metric 322, a message metric 324, and so on. The unread count metric 322 may indicate the number of unread messages in the message sequence of the channel. The unread count metric 322 may further indicate the number of unread messages in threads of the channel (e.g., may comprise a sum of unread messages of the channel and unread messages in threads grouped under the channel). The message metric 324 may indicate the number of messages that satisfy particular criteria. The message metric 324 may comprise a user reference metric that indicates the number of unread messages in the channel that reference the user (by use name, e.g., @username), including messages of the channel and threads of the channel. In another embodiment, the message metric 324 may indicate a number of messages that include a user-specified keyword, pertain to specified user, pertain to a particular resource object 111 (e.g., a particular data object 113, organizational object 115, analytic object 117, data card 118), and/or the like. The message metric 324 may comprise a plurality of filter and/or selection criteria combined using various combinational logic (e.g., Boolean AND, OR, XOR, and other operators). The criteria may be defined in the user profile 191 of the user, as disclosed herein.

Figure 3B:
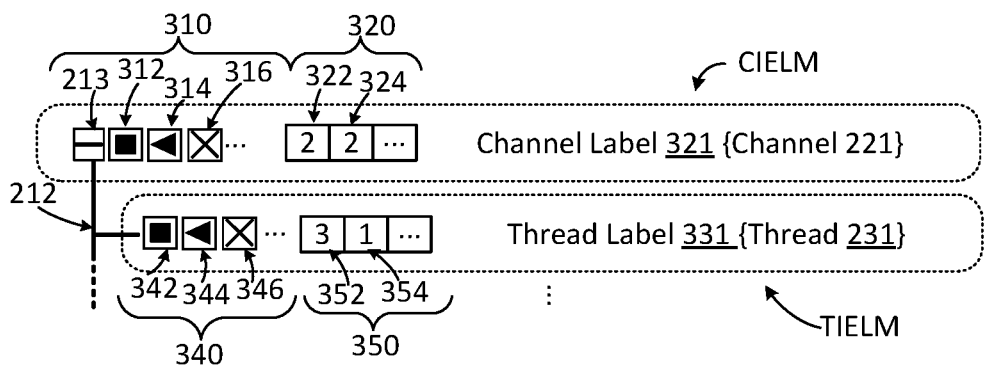

FIG. 3B depicts further embodiments of a CIELM and/or TIELM for use in the RTN interface 238 disclosed herein. The thread display control 213 of the CIELM interface of FIG. 3B may have been selected, which may cause thread(s) associated with the channel 221 to be displayed, including threads 231. The threads 231 may be visually anchored to the CIELM of the channel 221 within the RTN interface 238, as disclosed herein. The TIELM of FIG. 3B may comprise thread controls 340, thread metrics 350, a thread label 331, and so on. The thread label 331 may comprise a name, alias, description, and/or other information pertaining to the thread 231 of the TIELM.

The thread controls 340 may include a thread select control 342, a POI reference control 344, and an unsubscribe control 346. The select control 342 may be used to select the thread 231 in the RTN interface 238, as disclosed herein (cause messages of the thread 231 to be displayed, and updated, in real-time). Selection may further cause content authored through the RTN interface 238 to be submitted as a message to the thread 231. The POI reference control 344 may link to the reference object(s) 111 associated with the thread 231. Selection of the POI reference control 344 may cause the reference object(s) 111 to be displayed, involve display interfaces of the reference object(s) 111, and so on, as disclosed herein. The thread metrics 350 may include an unread metric 352 and a message metric 354. The unread metric 352 may indicate a number of unread messages in the thread 231. The message metric 354 may indicate a number of messages in the thread 231 that satisfy specified criteria, as disclosed above.

As illustrated in FIG. 3B, display of the TIELM may result in updating the channel metrics 320 of the CIELM. The channel metrics 320 may be updated to correspond to the channel 221 (and any "hidden" threads of the channel 221) and to include metrics being displayed by one or more TIELM. In FIG. 3B, the thread metrics 350 of the TIELM indicate that the thread 231 comprises three unread messages and one message that satisfies the message criterion. The unread count metric 322 of the CIELM may be updated to indicate that the channel 221 comprises two unread messages (excluding the three unread messages of thread 231), and that the channel 221 comprises two messages that satisfy the message criterion (e.g., mention the user), excluding the one message of thread 231 that satisfies the criterion.

Figure 4:
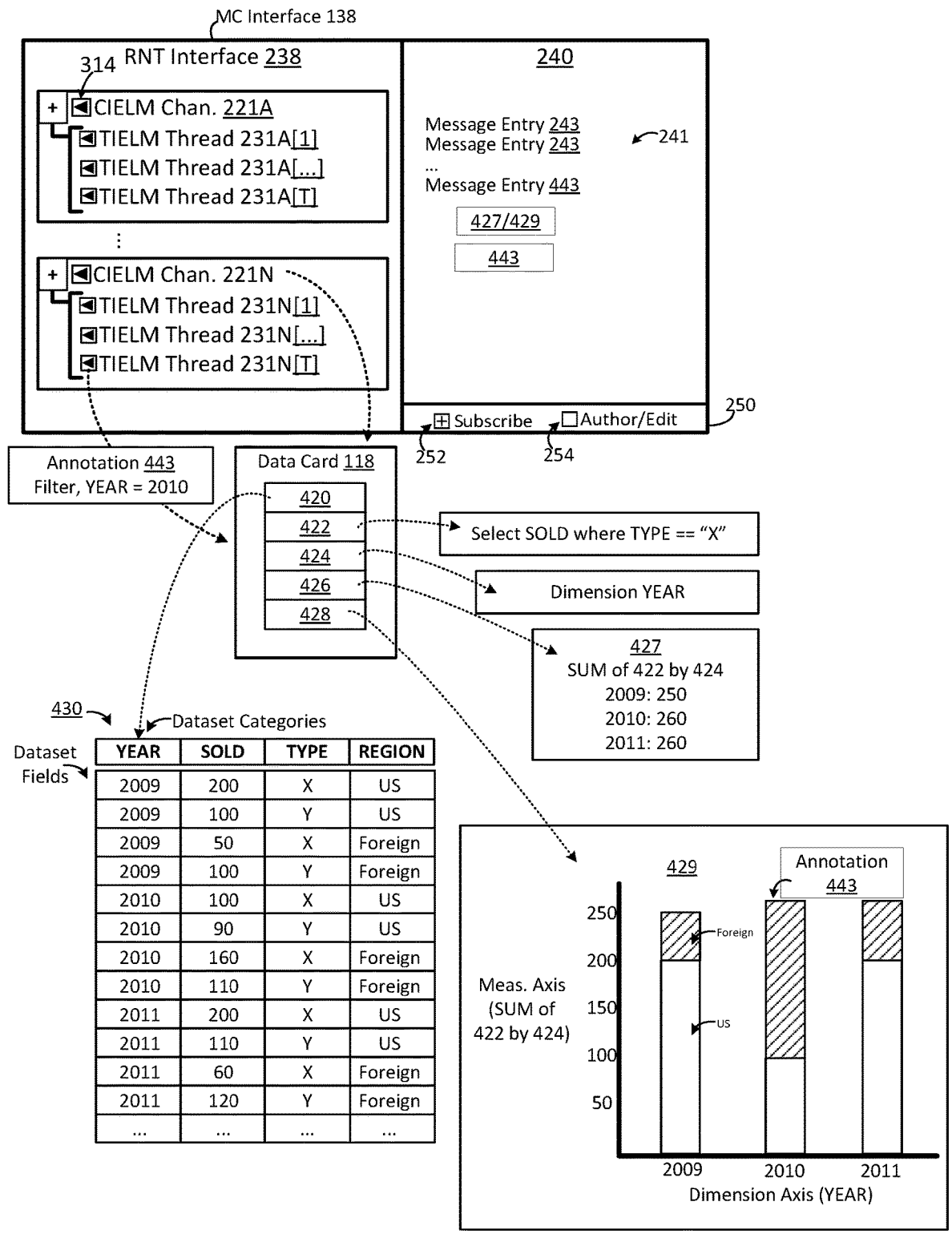
FIG. 4 depicts embodiments of a data card referenced by one or more of a channel, thread, and/or message.

FIG. 4 depicts further embodiments of a RTN interface 238 and a data card 118 referenced by one or more channels, threads, and/or messages. The RTN interface 238 of the FIG. 4 embodiment may display CIELM and TIELM in a vertical configuration that visually anchors respective channels 221A-N to the threads 231A-N thereof. A content display area 240 may be provided to a side of the RTN interface 238, and may comprise control elements 250, including the subscribe control 252, and author/edit control 254, disclosed herein.

In the FIG. 4 embodiment, the channel 221N may be anchored to a data card 118. As illustrated in FIG. 4, a data card 118 may comprise one or more of: a data set 420, a data specification 422, a parameter specification 424, an analysis specification 426, a visualization specification 428, and so on. The data card 118 may be configured to produce a quantitative data output 427 and/or data visualization 429, as disclosed in further detail herein.

The data set 420 may comprise, reference, and/or link to a data set (e.g., one or more data objects 113). The data set 420 may comprise a data set (e.g., a data set may be stored and/or maintained within the data card 118 itself). Alternatively, or in addition, the data set 420 may reference data objects 113 managed by one or more data resources 112. The data set 420 may reference one or more files (e.g., spreadsheets), data entries, database entries, data tables, and/or the like. The data set 420 may, in some embodiments, reference data by use of a data query, such as an SQL statement, stored procedure, distinguished name, XML path, and/or the like. The data set 420 of the data card 118 depicted in FIG. 4 may comprise and/or reference data 430. The data 430 may comprise a plurality of data elements (tuples), each comprising one or more data values or "fields," each of which may correspond to a respective data type or "category" (e.g., year, sold, type, and region). Although a particular example of a data set 420 is illustrated in FIG. 4, the disclosure is not limited in this regard and could be adapted for use with any suitable data in any suitable data format and/or data management system.

The data specification 422 may be configured to specify data for analysis (e.g., filter and/or select data to be analyzed and/or measured). The data specification 422 may specify, filter and/or select data of the data set 420 by use of one or more criteria. The criteria of the data specification 422 may correspond to the format and/or structure of the data set 420. By way of non-limiting example, in spreadsheet data, such as data 430, data may be specified by category (e.g., column labels); in an SQL database, data may be specified using, inter alia, SQL statements, stored procedures, or the like (e.g., select statements); in an XML database, data may be specified using XML Path Language (XPath), and/or the like; in a directory, data may be specified by distinguished name, and/or the like. In the FIG. 4 embodiment, data may be specified, filtered, and/or selected by use of data "category" criterion. The data specification 422 may, for example, specify the data fields of the "sold" type and/or category for measurement and/or analysis (e.g., select SOLD). The data specification 422 may further comprise criteria to exclude specified data. By way of non-limiting example, the data specification 422 may exclude data in which the corresponding "region" field has the value of "Foreign" (e.g., select SOLD where REGION !="Foreign" or select SOLD where REGION="US"). In another embodiment, the data specification 422 may filter data to specify the "SOLD" data for a particular year Y (e.g., select SOLD where YEAR="Y"). In the non-limiting example depicted in FIG. 4, the analysis specification 426 may specify "SOLD" data of the data set 420 where the "TYPE" category is X (e.g., select SOLD where TYPE="X"). Although particular embodiments of a data specification 422 are described herein, the disclosure is not limited in this regard and could be adapted to specify, filter, and/or select data of a data set 420 using any suitable techniques or mechanisms (e.g., any suitable specification, selection and/or filter criteria). As disclosed in further detail herein, the data specification 422 may correspond to a "measurement axis" for visualization of the data card 118.

The parameter specification 424 may be configured to specify parameters for analysis of the data set 420 specified by the data specification 422. The parameters may include "dimension" parameters, which may define the manner in which the specified data is organized and/or arranged for analysis. In the non-limiting example illustrated in FIG. 4, the data specification 422 may specify data in the "SOLD" category where "TYPE" is X (e.g., select "SOLD" where TYPE="X"). The parameter specification 424 may specify that the "SOLD" data are to be analyzed by "YEAR." Accordingly, the "dimension" parameter of the parameter specification 424 may comprise the "YEAR" category. As disclosed in further detail herein, the dimension of the parameter specification 424 may correspond to a "dimension axis" for a visualization of the data card 118.

The analysis specification 426 may specify analysis operation(s) to perform on the data specified by the data specification 422, in accordance with the parameters (e.g., dimension) specified by the parameter specification 424. The analysis specification 426 may define one or more operators, including, but not limited to: absolute value, addition, subtraction, summation, average, ceiling, concatenation, max, min, deviation, conversion operations, and/or the like. The operators may be specified to operate on particular data types (e.g., dates, times, strings, integers, decimal values, float values, and/or the like). The operators may further comprise conversion and/or formatting operators, such as an operator to convert a time value (e.g., seconds since Jan. 1, 1970) to a date string, and vice versa. In the non-limiting example of FIG. 4, the analysis specification 426 may specify a summation of the data specified by the data specification 422 (SOLD where TYPE="X") by the dimension specified by the parameter specification 424 (YEAR). As illustrated in the non-limiting example of FIG. 4, applying the SUM of the analysis specification 426 to the data specification 422 and parameter specification 424 disclosed above may be used to produce a quantitative data output 427. The quantitative data output 427 of the non-limiting example of FIG. 4 may comprise a sequence of quantitative data values, each quantitative data value corresponding to a respective dimension value (YEAR) (per the parameter specification 424). The quantitative data output 427 may be produced by applying the analysis operations of the analysis specification 426 (e.g., summation) to data specified by the data specification 422 and arranged per the parameter specification 424 (e.g., for each YEAR Y 2009 through 2011, SUM (select SOLD where TYPE="X" and YEAR="Y")). As illustrated in FIG. 4, the quantitative data output 427 may comprise a sequence of tuples (YEAR, SUM), including 2009: 250, 2010: 260, and 2011: 260.

In some embodiments, a data card 118 may further comprise a visualization specification 428, which may, inter alia, define a visualization for the quantitative data disclosed above. The visualization specification 428 may define a visualization type (e.g., chart type, such as single bar, grouped bar, line, area, pie, funnel, bubble, table, map, or the like) and/or corresponding axis. In the non-limiting example of FIG. 4, the visualization specification 428 specifies a "stacked bar chart," in which the Y axis (measurement axis) corresponds to the data specification 422 (e.g., the SOLD data) and the X axis (dimension axis) corresponds to the dimension specified by the parameter specification 424 (e.g., YEAR). The visualization specification 428 may further comprise a "series" or "sub-dimension" for the visualization. In the FIG. 4 embodiment, the visualization specification 428 designates the "REGION" field as the "sub-dimension" for the "stacked bar chart" visualization.

FIG. 4 depicts an embodiment of a data visualization 429 corresponding to the visualization specification 428. The data visualization 429 may comprise a graphic, interactive interface, and/or other graphical interface element. The data visualization 429 may be generated by an interface engine based on, inter alia, the data set 420, data specification 422, parameter specification 424, analysis specification 426, and visualization specification 428, disclosed herein. In the non-limiting example depicted in FIG. 4, the data visualization 429 depicts a stacked bar chart in which the overall height of each bar on the "measurement axis" (Y axis) corresponds to the operation(s) of the analysis specification 426 (a SUM) on data identified by the data specification 422 (SOLD where TYPE="X") by YEAR (in accordance with the parameter specification 424). The bars are arranged along a "dimension axis" (X axis) defined by, inter alia, the parameter specification 424. The stacked portions of the respective bars correspond to the "sub-dimension" of the visualization specification 428 (e.g., the amount of SOLD where TYPE="X" in the "US" and "Foreign" regions, respectively). The sub-dimension of the visualization specification 428 may result in a data visualization 429 that provides an easy-to-digest, graphical indication of the atypical decrease to the amount of X SOLD in the US during 2010 (and corresponding increase to X SOLD in the Foreign region during 2010). These atypical changes may not be as readily appreciated in other depictions of the data, such as the quantitative data outputs 427 disclosed above, or a standard, non-stacked, bar chart.

As disclosed above, the channel 221N may be anchored to the data card 118 (the POI anchor 154 of the corresponding channel record 150 may reference the data card 118 in the analytic resources 116). Selecting a POI reference of the channel 221N may cause one or more of the quantitative data output 427 and/or data visualization 429 to be displayed. The quantitative data output 427 and/or data visualization 429 to be displayed in the content display area 240 and/or in a separate display interface (not shown to avoid obscuring the details of the disclosed embodiments). The quantitative data output 427 and/or data visualization 429 may be produced by the analytic resources 116 (by use of the reference manager 128 and/or access manager 129 of FIG. 1). The quantitative data output 427 and/or data visualization 429 anchored to the channel 221N may be updated in real-time (with current data associated with the data card 118 and/or underlying data objects 113).

As disclosed above, the data visualization 449 of the data card 118 may provide an easy-to-digest visual representation of the data set 420, which may enable a user to identify the "outlying" sales data of 2010. A user may create a thread 231N[T] to discuss the 2010 data (e.g., discuss causes, and possible remedies for the decline in US sales of product X, or how to increase foreign sales of product X). The POI of the thread 231N[T] may "inherit" the data card 118 of channel 221N. The POI of the thread 231N[T] may modify the POI to specify, filter, and/or select the specific data pertaining to the thread 231N[T] (YEAR 2010). The POI of thread 231N[T] may comprise an annotation 443, which may refine the data specification 422 of the data card 118 (to select YEAR 2010 and/or filter years 2009 and 2011). The annotation 443 may further comprise a label (or other content) for display on the data visualization 429 of the data card 118. The annotation 443 may be tied to the revised data specification 422 (YEAR 2009), which may remain associated with the data for YEAR 2009 even if the underlying visualization type is changed (e.g., changed from the stacked bar graph of FIG. 4 to a pie graph, or other chart type). Selecting the POI reference of the thread 231N[T] may cause the data visualization 429 to be displayed as modified by (and in conjunction with) the annotation 443 of the thread 231N[T].

Figure 5:
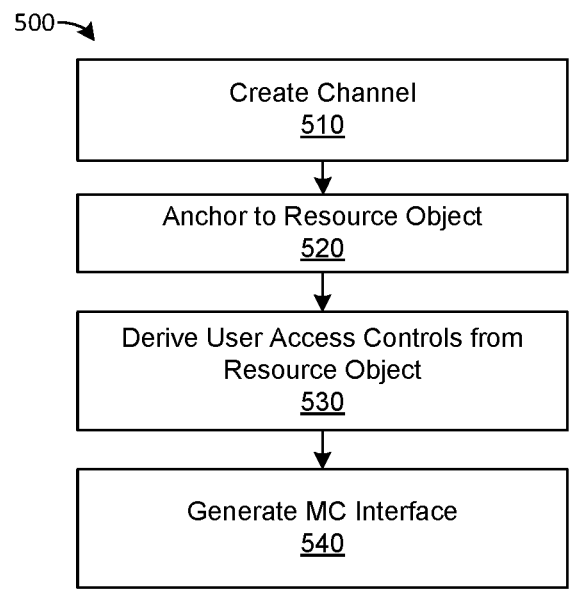
FIG. 5 is a flow diagram of one embodiment of a method for online collaboration and/or messaging, as disclosed herein.

FIG. 5 is a flow diagram of one embodiment of a method 500 for messaging and collaboration, as disclosed herein. Step 510 may comprise creating a channel as disclosed herein. Step 510 may comprise creating a channel pertaining to a resource object 111. Step 510 may comprise automatically creating channel records 150 in response to creation, registration, and/or user interaction with respective resource objects 111. Step 510 may further comprise creating one or more threads pertaining to the channel, as disclosed herein. Step 520 may comprise anchoring the channel to the resource object 111, as disclosed herein. Step 530 may comprise providing users with access to the channel in accordance with access controls of the resource object 111, as disclosed herein. Step 540 may comprise generating a messaging and/or collaboration interface comprising graphical interface element(s) representing the channel, threads pertaining to the channel, messages of the channel, and/or the like. Step 540 may comprise visually anchoring thread interface elements to channel interface element(s) thereof. Step 540 may comprise displaying the resource object 111 (e.g., a data set, data visualization, and/or the like) in response to user selection of the interface object pertaining to the resource object 111, as disclosed herein. In some embodiments, Step 540 may comprise displaying an annotation on a data visualization in response to user selection (e.g., annotation 443, as disclosed above).

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the claims.

The invention claimed is:

1. A computer-implemented method for managing messaging and collaboration pertaining to data objects, comprising:
creating a plurality of channels, each channel pertaining to a respective analytic object, each analytic object defining a visualization of a respective data set;
granting a user access to a group of two or more of the channels in response to determining that the user is authorized to access the respective analytic objects of each of the two or more channels; and
generating a graphical user interface for display to the user, the graphical user interface comprising channel interface elements representing each of the two or more channels, each channel interface element comprising a reference control configured to display the visualization of the analytic object pertaining to the channel.

2. The computer-implemented method of claim 1, further comprising:
creating first threads pertaining to a first channel of the two or more channels; and
granting the user access to the first threads in response to determining that the user is authorized to access the analytic object of the first channel.

3. The computer-implemented method of claim 2, wherein generating the graphical user interface for display to the user further comprises:
visually anchoring first thread interface elements representing one or more of the first threads to a channel interface element representing the first channel.

4. The computer-implemented method of claim 2, further comprising:
creating second threads pertaining to a second channel of the two or more channels; and
granting the user access to the second threads in response to determining that the user is authorized to access the analytic object of the second channel.

5. The computer-implemented method of claim 4, wherein generating the graphical user interface for display to the user further comprises:
visually anchoring first thread interface elements representing one or more of the first threads to a channel interface element representing the first channel; and
visually anchoring second thread interface elements representing one or more of the second threads to a channel interface element representing the second channel.

6. The computer-implemented method of claim 5, further comprising:

detecting user selection of the first channel interface element; and displaying an ordered list of message elements in a message display area in response to the detecting, each of the message elements representing a message of the first channel.

7. The computer-implemented method of claim 5, further comprising:

detecting user selection of one of the second thread interface elements; and displaying an ordered list of message elements in a message display area in response to the detecting, each of the message elements representing a message of the thread corresponding to the selected second thread interface element.

8. The computer-implemented method of claim 1, further comprising:

creating a first thread pertaining to an annotation on a first visualization of the analytic object of a first one of the plurality of channels.

9. The computer-implemented method of claim 8, wherein generating the graphical user interface for display to the user further comprises:

displaying a thread interface element representing the first thread; and displaying the annotation on the first visualization in response to user selection of the thread interface element.

10. The computer-implemented method of claim 1, further comprising:

creating a first thread pertaining to a first portion of a data set pertaining to a first one of the plurality of channels;

wherein generating the graphical user interface for display to the user further comprises:

displaying a thread interface element representing the first thread; and displaying the first portion of the data set in response to user selection of the thread interface element.

11. A non-transitory computer-readable storage medium comprising instructions configured to cause a computing device to perform a operations for managing messaging and collaboration pertaining to data objects, the operations comprising:

creating a plurality of channels, each channel pertaining to a respective analytic object, each analytic object defining a visualization of a respective data set;

granting a user access to a group of two or more of the channels in response to determining that the user is authorized to access the respective analytic objects of each of the two or more channels; and generating a graphical user interface for display to the user, the graphical user interface comprising channel interface elements representing each of the two or more channels, each channel interface element comprising a reference control configured to display the visualization of the analytic object pertaining to the channel.

12. The non-transitory computer-readable storage medium of claim 11, the operations further comprising:

creating first threads pertaining to a first channel of the two or more channels; and granting the user access to the first threads in response to determining that the user is authorized to access the analytic object of the first channel.

13. The non-transitory computer-readable storage medium of claim 12, wherein generating the graphical user interface for display to the user further comprises:

visually anchoring first thread interface elements representing one or more of the first threads to a channel interface element representing the first channel.

14. The non-transitory computer-readable storage medium of claim 12, further comprising:

creating second threads pertaining to a second channel of the two or more channels; and granting the user access to the second threads in response to determining that the user is authorized to access the analytic object of the second channel.

15. The non-transitory computer-readable storage medium of claim 14, wherein generating the graphical user interface for display to the user further comprises:

visually anchoring first thread interface elements representing one or more of the first threads to a channel interface element representing the first channel; and visually anchoring second thread interface elements representing one or more of the second threads to a channel interface element representing the second channel.

16. The non-transitory computer-readable storage medium of claim 15, further comprising:

detecting user selection of the first channel interface element; and displaying an ordered list of message elements in a message display area in response to the detecting, each of the message elements representing a message of the first channel.

17. The non-transitory computer-readable storage medium of claim 15, the operations further comprising:

detecting user selection of one of the second thread interface elements; and displaying an ordered list of message elements in a message display area in response to the detecting, each of the message elements representing a message of the thread corresponding to the selected second thread interface element.

18. The non-transitory computer-readable storage medium of claim 11, the operations further comprising:

creating a first thread pertaining to an annotation on a first visualization of the analytic object of a first one of the plurality of channels.

19. The non-transitory computer-readable storage medium of claim 17, wherein generating the graphical user interface for display to the user further comprises:

displaying a thread interface element representing the first thread; and displaying the annotation on the first visualization in response to user selection of the thread interface element.

20. The computer-implemented method of claim 11, further comprising:

creating a first thread pertaining to a first portion of a data set pertaining to a first one of the plurality of channels;

wherein generating the graphical user interface for display to the user further comprises:

displaying a thread interface element representing the first thread; and displaying the first portion of the data set in response to user selection of the thread interface element.

* * * * *